US 6,560,959 B2

(12) United States Patent
Katsuta et al.

(10) Patent No.: US 6,560,959 B2
(45) Date of Patent: May 13, 2003

(54) EXHAUST GAS PURIFICATION APPARATUS OF INTERNAL COMBUSTION ENGINE

(75) Inventors: Hiroyuki Katsuta, Chiryu (JP); Yoshihiro Majima, Aichi-pref. (JP); Yukihiro Yamashita, Aichi-pref. (JP)

(73) Assignee: Denso Corporation, Aichi-Pref. (JP)

( * ) Notice: Subject to any disclaimer, the term of this patent is extended or adjusted under 35 U.S.C. 154(b) by 0 days.

(21) Appl. No.: 09/729,855

(22) Filed: Dec. 6, 2000

(65) Prior Publication Data

US 2001/0002538 A1 Jun. 7, 2001

(30) Foreign Application Priority Data

Dec. 6, 1999 (JP) ............................................. 11-346386
Dec. 24, 1999 (JP) ............................................. 11-365827

(51) Int. Cl.[7] ............................................. F01N 3/00
(52) U.S. Cl. .................... 60/284; 60/285; 123/90.15; 123/198 F
(58) Field of Search .......................... 60/274, 284, 285, 60/288, 300, 286; 123/90.15, 90.16, 198 F, 606, 607, 481

(56) References Cited

U.S. PATENT DOCUMENTS

| 3,800,772 | A | * | 4/1974 | Gospodar .................... 60/284 |
| 4,007,590 | A | * | 2/1977 | Nagai et al. .................. 60/284 |
| 5,419,121 | A | * | 5/1995 | Sung et al. ................... 60/284 |
| 5,429,079 | A | * | 7/1995 | Murata et al. ............. 123/90.16 |
| 5,577,383 | A | * | 11/1996 | Kuroda et al. ................ 60/284 |
| 5,613,359 | A | * | 3/1997 | Zahn et al. ................... 60/288 |
| 5,634,332 | A | * | 6/1997 | Tanaka et al. ................. 60/288 |
| 5,644,913 | A | * | 7/1997 | Iwai et al. .................... 60/284 |
| 5,845,492 | A | * | 12/1998 | Isobe et al. ................... 60/284 |
| 5,867,982 | A | * | 2/1999 | Tengblad et al. .............. 60/284 |
| 5,887,422 | A | * | 3/1999 | Abe et al. ..................... 60/284 |
| 5,930,992 | A | * | 8/1999 | Esch et al. ................ 123/198 F |
| 5,979,158 | A | * | 11/1999 | Kaiser et al. ................. 60/300 |
| 6,023,929 | A | * | 2/2000 | Ma ......................... 123/198 F |
| 6,041,593 | A | * | 3/2000 | Karlsson et al. .............. 60/284 |
| 6,122,910 | A | * | 9/2000 | Hoshi et al. .................. 60/285 |
| 6,141,960 | A | * | 11/2000 | Takami et al. ................ 60/286 |
| 6,164,065 | A | * | 12/2000 | Denari et al. ................. 60/284 |
| 6,176,215 | B1 | * | 1/2001 | Baur et al. ................... 123/606 |
| 6,176,216 | B1 | * | 1/2001 | Yamada et al. ............. 123/607 |
| 6,266,957 | B1 | * | 7/2001 | Nozawa et al. ............... 60/284 |
| 6,293,095 | B1 | * | 9/2001 | Yamamoto et al. ........... 60/284 |

FOREIGN PATENT DOCUMENTS

| JP | 6-81637 | | 3/1994 |
| JP | 6-257488 | * | 9/1994 |
| JP | 6-257546 | * | 9/1994 |
| JP | 7-133716 | | 5/1995 |
| JP | 9-96216 | | 4/1997 |
| JP | 11-82111 | | 3/1999 |

* cited by examiner

Primary Examiner—Thomas Denion
Assistant Examiner—Tu M. Nguyen
(74) Attorney, Agent, or Firm—Nixon & Vanderhye PC

(57) ABSTRACT

An upstream-side catalyst is provided at a location in close to an exhaust manifold of an engine. An HC absorbent and a downstream-side catalyst are installed in series at the downstream side. With the upstream-side catalyst put in an inactive state, the HC absorbent absorbs HC having passing through the upstream-side catalyst. After the upstream-side catalyst has been activated, HC released from the HC absorbent is refluxed to the upstream side of the upstream-side catalyst through a reflux path to be removed by the upstream-side catalyst. At that time, the ECU executes catalyst-early-warming control right after an engine start in order to raise the temperature of the upstream-side catalyst at an early time so as to shorten the time it takes to activate the upstream-side catalyst.

9 Claims, 12 Drawing Sheets

FIG. 6A
FIG. 6B
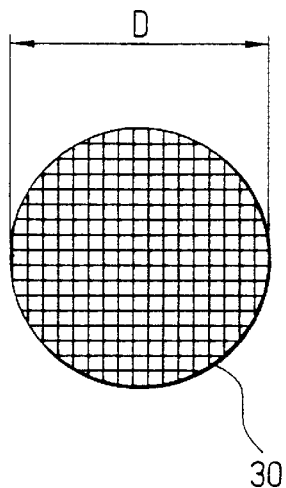
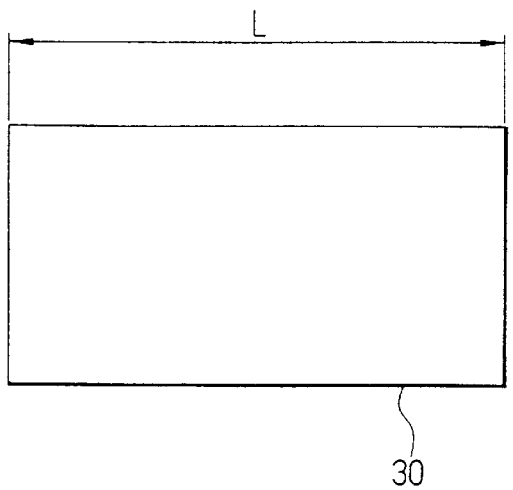
FIG. 10
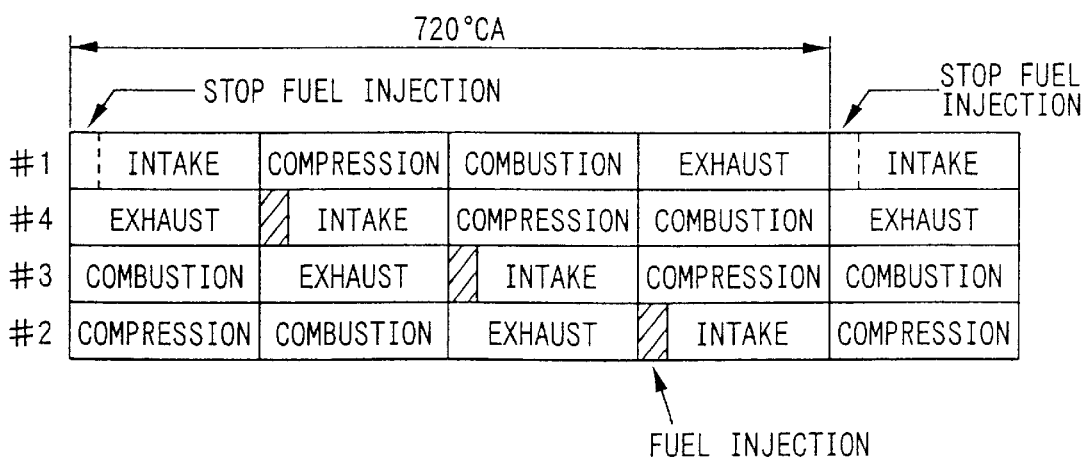

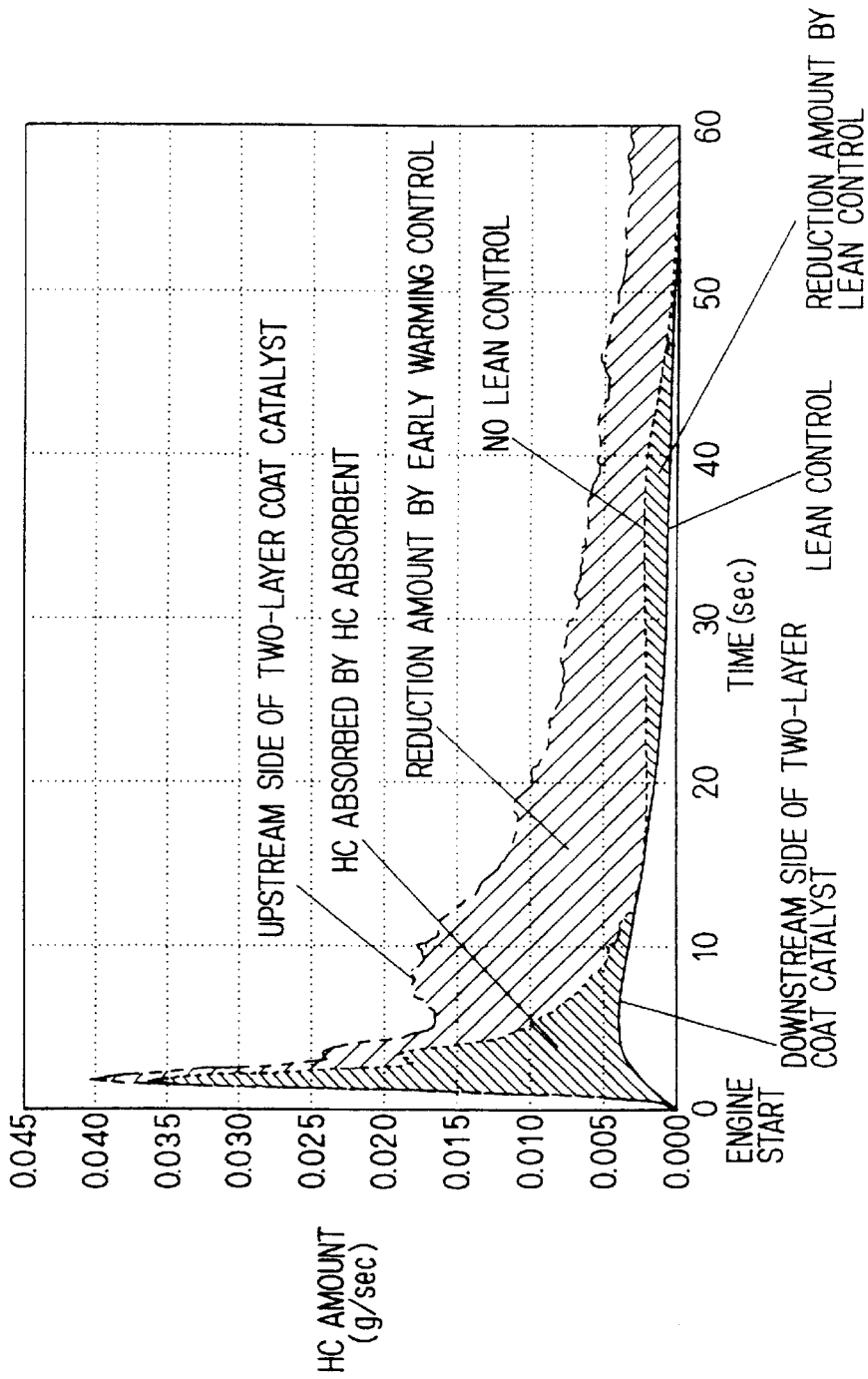

1 …

EXHAUST GAS PURIFICATION APPARATUS OF INTERNAL COMBUSTION ENGINE

CROSS REFERENCE TO RELATED APPLICATION

This application is based on and incorporates herein by reference Japanese Patent Application Nos. Hei. 11-346386 filed on Dec. 6, 1999, and Hei. 11-365827 filed on Dec. 24, 1999.

BACKGROUND OF THE INVENTION

1. Field of the Invention

The present invention relates to an internal combustion engine exhaust gas purification apparatus for purifying exhaust gas from the internal combustion engine by removing HC from the exhaust gas.

2. Description of Related Art

An ordinary gasoline engine made in recent years has a three-way catalyst provided in an exhaust pipe thereof for purifying exhaust gas by removing noxious components of the exhaust gas such as HG, GO (carbon monoxide) and NOx (nitrogen oxide) from the gas. In the cold state of the internal combustion engine right after an engine start, however, the temperature of the three-way catalyst does not rise to an activation temperature. That is, the three-way catalyst is still in a non-activated state right after the engine start. Thus, the three-way catalyst is not capable of purifying the exhaust gas sufficiently. As a result, the exhaust emission is worsened.

In order to solve this problem, an HC absorbing catalyst is installed at the downstream side of a three-way catalyst as is disclosed in JP-A-11-82111. The HC absorbing catalyst absorbs HC having passed through the three-way catalyst, which is still in a non-activated state. The disclosed HC absorbing catalyst is a two-layer coat catalyst, which is made by coating the surface of the HC absorbing layer for absorbing HC with a layer of a three-way catalyst. When the layer of the three-way catalyst of the two-layer coat catalyst is put in an activated state, the layer of the three-way catalyst removes HC released from the HC absorbing layer.

In the cold state of the internal combustion engine right after the engine start, the state of fuel combustion is unstable, generating a considerably large amount of unburned HC. Thus, when it takes a long time to activate the three-way catalyst or the two-layer coat catalyst, the amount of HC absorbed by the two-layer coat catalyst becomes saturated, thereby making it no longer possible for the catalyst to absorb HC. As a result, the amount of HC exhausted to the atmosphere increases. In order to solve this problem, the size of two-layer coat catalyst is increased. However, not only does this solution dissatisfy a demand for a low cost and space saving, but it also takes an even longer time to raise the temperature of the two-layer coat catalyst or to activate the two-layer coat catalyst.

In particular, in a configuration wherein the two-layer coat catalyst is installed at the downstream side of the three-way catalyst as in the disclosed case, since the distance from the engine to the two-layer coat catalyst is large, the gas loses heat before the time when the exhaust gas enters into the catalyst, thereby inevitably decreasing the temperature thereof. Thus, it unavoidably takes too long time to increase the temperature of the two-layer coat catalyst or to activate the catalyst. In the mean time, the amount of HC absorbed by the HC absorbing layer becomes saturated. As a result, the HC absorbing layer is no longer capable of absorbing HC.

Further, in order to solve the above described problem, there has been adopted a technique to heat a catalyst to an activation temperature at an early time by raising the exhaust gas temperature through execution of control to heat the catalyst early such as ignition retard control at an engine cold start. In order to further improve a catalyst-warming function, as is disclosed in JP-A-9-96216, there has been proposed a technique whereby, during execution of control to heat a catalyst at an early time, injection of fuel into some cylinders of the engine is halted in order to increase the concentration of oxygen (the amount of unburned air) in the exhaust gas, and the amount of fuel injected into the remaining working cylinders is raised in order to increase the quantities of rich components of the exhaust gas such as HC and CO so as to drive an ignition device such as a glow plug provided in an exhaust pipe to ignite the exhaust gas to generate after-burning in the exhaust pipe, and to use heat generated by the after-burning for warming the catalyst. Here, a cylinder, injection of fuel to which is halted, is referred to as a halted-injection cylinder.

However, in JP-A-9-96216, in order to generate the after-burning in the exhaust pipe, it is necessary to install an ignition device such as a glow plug in the exhaust pipe. Thus, the proposed technique has problems of complicated configuration and high cost.

SUMMARY OF THE INVENTION

An object of the present invention addressing such problems to provide an exhaust gas purification apparatus of an internal combustion engine capable of substantially reducing the amount of HC exhausted at an engine start.

In order to achieve the object, in order to remove HC (HC) released from a HC absorbent within a catalyst for absorbing HC due to a rising temperature of the substance, an exhaust gas purification apparatus according to a first aspect of the present invention is provided with a catalyst-early-warming means for early raising the temperature of the catalyst right after the internal combustion engine start to activate the catalyst at an early time. Since the catalyst can be activated with certainty right after the internal combustion engine start before the amount of HC absorbed by the HC absorbent reaches a saturation level, the HC absorbent is capable of absorbing unburned HC reliably right after the engine start, thereby allowing the exhaust gas to be cleaned by the catalyst. Therefore, the amount of HC exhausted right after the engine start can be considerably reduced in comparison with the conventional catalyst. In addition, the time for activation of the catalyst can be made shorter. Thus, the amount of HC absorbed by the HC absorbent can be reduced by a quantity proportional the decrease in time. As a result, it is possible to satisfy the demand for a low cost and space saving without the need to increase the size of the HC absorbent.

In this case, the farther the exhaust gas flows in the downstream direction of the exhaust-gas path, the more the temperature of the exhaust gas decreases. Thus, when the catalyst for removing HG released from the HG absorbent is provided at the downstream side of the HG absorbent, the HG absorbent will be heated to a releasing temperature before the catalyst reaches an activation temperature. As a result, it is feared that HG released from the HG absorbent cannot be removed by using the catalyst and is exhausted to the atmosphere. In addition, there also exists the fact that the releasing temperature of the HG absorbent is generally lower than the activation temperature of the catalyst.

Taking the above absorption rates into consideration, the catalyst for removing HC released from the HC absorbent may be provided at the upstream side of the HC absorbent, and the HC released from the HC absorbent may be returned to the upstream side of the catalyst through a reflux path. As an alternative, the catalyst is held on the surface of the HC absorbent to form an integrated two-layer coat catalyst including the catalyst and the HC absorbent, and the two-layer coat catalyst is provided at a location in close to an exhaust manifold as in the case with an exhaust gas purification apparatus.

By employing the two-layer coat catalyst, the catalyst in the upper layer directly exposed to exhaust gas is heated first to an activation temperature before the HC absorbent in the lower layer is heated to an releasing temperature so that the catalyst in the upper layer is capable of removing HC released from the HC absorbent with certainty. In addition, by providing the two-layer coat catalyst at a location in close to the exhaust manifold, the catalyst can be exposed to high temperature exhaust gas. Thus, the catalyst can be activated in an even shorter period of time by the high-temperature exhaust gas in conjunction with a catalyst early-warming effect provided by the catalyst-early-warming means. As a result, the effect of reducing the amount of HC exhausted at the internal combustion engine start can be further increased.

A second object of the present invention is to provide an early-warming control apparatus that is capable of warming a catalyst for purifying exhaust gas at an early time by generating after-burning inside a path through which the exhaust gas flows without an ignition device in the path, and offers a simplified configuration and a reduced cost as well as an improved catalyst-warming function.

In order to achieve the object, in an early-warming control apparatus for warming a catalyst for purifying exhaust gas of an internal combustion engine at an early time in accordance with a second aspect of the present invention, in execution of control to heat a catalyst at an early time, an exhaust-gas-heating control means executes ignition retard control to raise the exhaust gas temperature making a rich component of the exhaust gas burnable inside the path, and a cylinder deactivation operation control means halts injection of fuel into some cylinders of the internal combustion engine, operating the internal combustion engine by using the remaining cylinders. A cylinder, injection of fuel to which is halted, is referred to as a halted-injection cylinder and the remaining cylinders are each known as a working cylinder. By doing so, in execution of the control to heat a catalyst at an early time, gas exhausted by the working cylinder is heated to the temperature making the exhausted gas burnable inside the path due to the ignition retard control. Thus, when rich components such as HG and CO of this high-temperature exhaust gas are mixed with oxygen of unburned air exhausted by the halted-injection cylinder, after-burning occurs in the path and the temperature of the catalyst is raised by combustion heat generated by the after-burning. As a result, the catalyst can be heated at an early time after the engine start and, since there is no need to install an ignition device for igniting exhaust gas, the configuration can be made simple and the cost can be reduced.

BRIEF DESCRIPTION OF THE DRAWINGS

Additional objects and advantages of the present invention will be more readily apparent from the following detailed description of preferred embodiments thereof when taken together with the accompanying drawings in which:

FIG. 6A is a front view showing the two-layer coat catalyst;

FIG. 6B is a side view showing the two-layer coat catalyst;

FIG. 7 is a time charts showing HC-removing characteristics an engine start (second embodiment);

FIG. 10 is an explanatory diagram showing combustion cycles and fuel injection timings in a cylinder deactivation operation (third embodiment);

DETAILED DESCRIPTION OF PREFERRED EMBODIMENTS PREFERRED (First Embodiment)

The first embodiment of the present invention is explained by referring to FIGS. 1 and 2 as follows.

Figure 1:
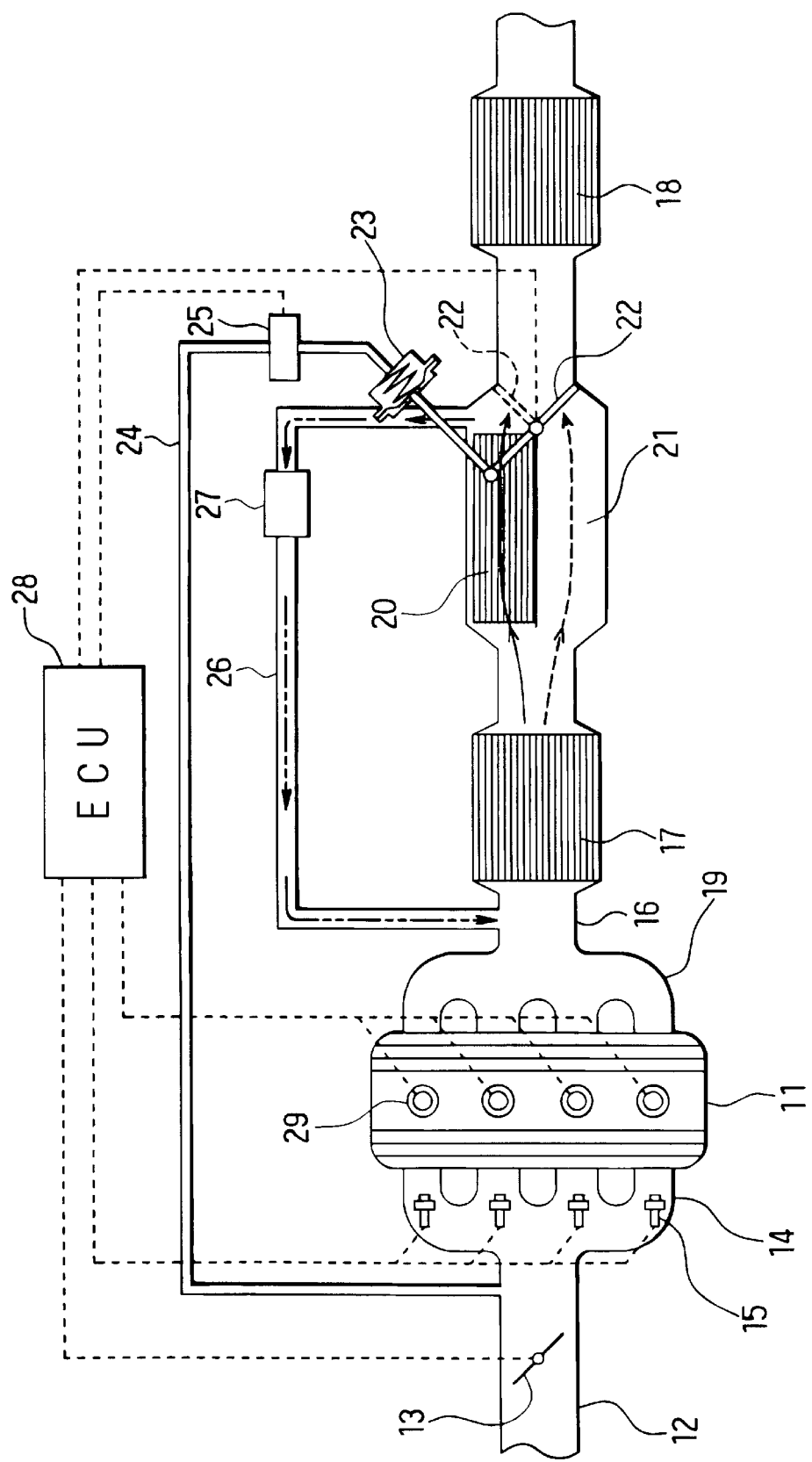
FIG. 1 is a schematic view showing an engine control system (first embodiment)
Figure 2:
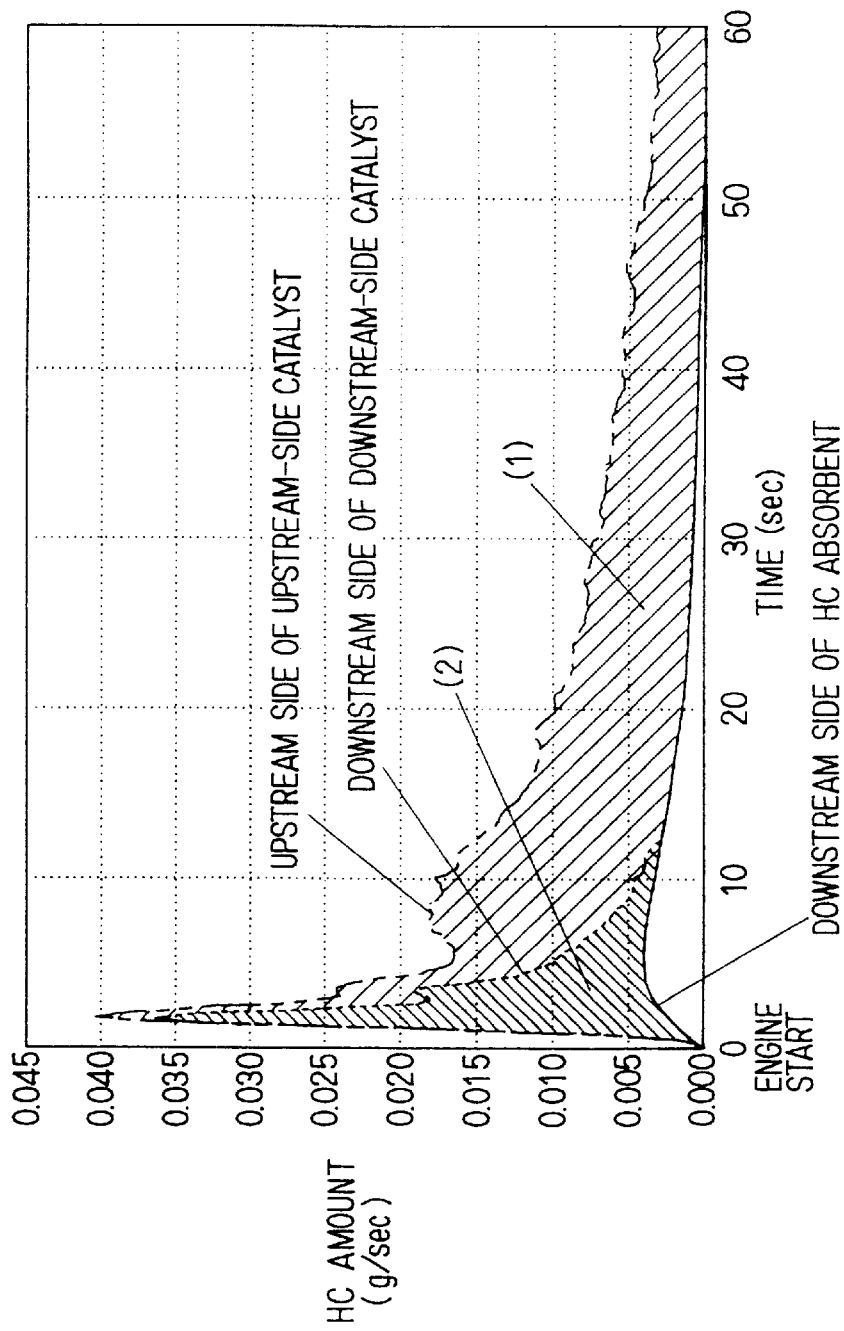
FIG. 2 is a time charts showing HC-removing characteristics after an engine start (first embodiment)

As shown in FIG. 1, a throttle valve 13 for adjusting throttle opening is provided in an intake pipe 12 of an engine 11. A fuel injection valve 15 for injecting fuel into cylinders is provided in cylinder branch pipe units of an intake manifold 14 for introducing fuel into the cylinders.

An upstream-side catalyst 17 and a downstream-side catalyst 18, which are used for reducing the quantity of each noxious component in exhaust gas, are provided in series on an exhaust pipe 16 of the engine 11. The upstream-side and downstream-side catalysts 17 and 18 are each a three-way catalyst for removing HC, Co and NOx or an oxide catalyst for removing HC and CO. The upstream-side catalyst 17 is provided at a location close to an exhaust manifold 19, so that early activation thereof can be completed while the engine 11 starts. The downstream-side catalyst 18 is provided typically on the lower-surface side of the body of the vehicle. A HC (HC) absorbent 20 made of typically zeolite is provided in the exhaust pipe 16 between the upstream-side and downstream-side catalysts 17 and 18. The HC absorbent 20 absorbs HC from exhaust gas at low temperatures. When the HC absorbent 20 is heated to release temperature, HC absorbed by the HC absorbent 20 is released.

Between the upstream and downstream sides of the HC absorbent 20 in the exhaust pipe 16, a bypass passage 21 is provided for allowing the exhaust gas flowing from the upstream-side catalyst 17 to bypass the HC absorbent 20. A switching damper 22 is provided at a merge portion at the downstream side of the bypass passage 21. An actuator 23 actuates the switching damper 22. The actuator 23 is connected to the intake pipe 12 through an intake pressure introducing pipe 24. An electromagnetic valve 25 provided in the intake pressure introducing pipe 24 switches a pressure introduced into the actuator 23 between an atmospheric pressure and an intake pressure, for controlling the operation of the actuator 23.

Between the downstream side of the HC absorbent 20 and the upstream side of the upstream-side catalyst 17, there a reflux path 26 is provided for refluxing HC released from the HC absorbent 20 along with some exhaust gas to the upstream side of the upstream-side catalyst 17 in a direction denoted by a double-dashed arrow in FIG. 1. In the reflux path 26, a check valve 27 is installed for preventing the HC and the exhaust gas from flowing in the reversed direction, that is, a direction opposite to the direction denoted by the double-dashed arrow.

An engine control circuit 28, which is referred to hereafter as an ECU, employs a microcomputer as a main component. The ECU 28 controls the amount of the fuel injected from the fuel injection valve 15 by execution of a fuel injection control program stored in an embedded ROM (a storage medium). In addition, the ECU 28 controls ignition timings of an ignition plug 29 by execution of an ignition control program stored in the ROM. It should be noted that neither the fuel injection control program nor the ignition control program is shown in the figure.

When the engine 11 cold starts, the upstream-side and downstream-side catalysts 17 and 18 are each in a non-activated state so that they are not capable of removing HC exhausted from the engine 11.

In order to solve this problem, the ECU 28 controls the switching damper 22 so that the HC absorbent 20 temporarily absorbs HC from exhaust gas during a period in which the upstream-side and downstream-side catalysts 17 and 18 are each in a non-activated state and hence incapable of removing HC exhausted from the engine 11. After the upstream-side catalyst 17 is activated and put in a state of being sufficiently capable of removing HC, HC released from the HC absorbent 20 is refluxed to the upstream side of the upstream-side catalyst 17 for removing the HC. In this case, the ECU 28 executes catalyst-early-warming control right after the start of the engine 11 to raise the temperature of the upstream-side catalyst 17 so as to shorten the time it takes to activate the upstream-side catalyst 17. The catalyst-early-warming control is implemented by executing at least one of ignition timing retard control, air-fuel-ratio lean control, secondary-air introduction control and later ignition control.

The ignition timing retard control and the air-fuel-ratio lean control are executed by correcting a delay angle of an ignition timing and by shifting an air-fuel ratio to a lean area respectively in order to delay a combustion of mixed gas in the cylinders so as to raise the temperature of exhaust gas and, hence, to increase the temperature of the upstream-side catalyst 17. The secondary-air introduction control is executed by introducing external air to the upstream side of the upstream-side catalyst 17 by an air pump in order to burn HC and CO in the exhaust pipe 16 (after-burning) so as to raise the temperature of exhaust gas and, hence, to increase the temperature of the upstream-side catalyst 17. The later ignition control is implemented by providing an ignition device for carrying out after-burning on the upstream side of the upstream-side catalyst 17 in the exhaust pipe 16. After-burning is carried out to raise the temperature of exhaust gas and, hence, to increase the temperature of the upstream-side catalyst 17. These functions to execute catalyst-early-warming control correspond to a catalyst-early-warming means cited in an aspect of the present invention.

The ECU 28 executes at least one of the catalyst-early-warming controls right after the engine 11 starts, and controls the switching damper 22 to sufficiently reduce the amount of HC exhausted since a time right after the engine start as follows.

When the upstream-side and downstream-side catalysts 17 and 18 are each in non-activated state and hence incapable of removing HC sufficiently right after the engine start, the switching damper 22 blocks the bypass passage 21 as denoted by a solid line representing the switching damper 22 in FIG. 1. With the switching damper 22 switched to this position, HC flows through the HC absorbent 20 as denoted by a solid-line arrow. In this state, the HC absorbent 20 absorbs HC having passed through the upstream-side catalyst 17.

After the upstream-side catalyst 17 is activated and put in a state of being sufficiently capable of removing HC, the switching damper 22 opens the bypass passage 21 as denoted by a dashed line representing the switching damper 22 in FIG. 1. With the switching damper 22 switched to this position, exhaust gas getting out from the upstream-side catalyst 17 mostly flows through the bypass passage 21 as denoted by a dashed-line arrow. At the same time, a part of the exhaust gas is refluxed to the upstream side of the upstream-side catalyst 17 through the HC absorbent 20 and the reflux path 26. In this state, HC released from the HC absorbent 20 as the HC absorbent 20 reaches the release temperature is removed by the upstream-side catalyst 17.

Here, after a short time has passed since the activation of the upstream-side catalyst 17, the downstream-side catalyst 18 can also be activated. After the downstream-side catalyst 18 has been activated, the switching damper 22 may be switched back to the position to close the bypass passage 21 so that HC released from the HC absorbent 20 flows to the downstream catalyst 18 for removing the HC.

The HC reduction effect exhibited by the exhaust gas purification apparatus implemented by the first embodiment described above will be explained with reference to FIG. 2. In the first embodiment, the upstream-side catalyst 17 is installed at a location close to the exhaust manifold 19 and execution of the catalyst-early-warming control is begun at the start of the engine 11 in order to early activate the upstream-side catalyst 17. Thus, the upstream-side catalyst 17 can be activated within about 5 seconds after the engine start to allow an HC-removing effect exhibited clearly by the upstream-side catalyst 17 as denoted by a hatched portion (1) in FIG. 2 to be reaped. Before the upstream-side catalyst 17 enters an activated state, the HC absorbent 20 absorbs HC having passed through the upstream-side catalyst 17 as denoted by a hatched portion (2) in FIG. 2. In this way, the HC absorption effect exhibited by the upstream-side catalyst 17 as denoted by the hatched portion (2) in FIG. 2 and the HC-removing effect exhibited by the upstream-side catalyst 17 as denoted by the hatched portion (1) in FIG. 2 effectively decrease the amount of HC flowing to the downstream side of the HC absorbent 20 right after the engine start.

When the catalyst-early-warming control is not executed, it will take a long time to put the upstream-side catalyst 17 in an activated state. Thus, the amount of HC absorbed by the HC absorbent 20 gets saturated, making it no longer possible to absorb HC. As a result, the amount of HC exhausted to the atmosphere inevitably increases. If the size of the HC absorbent 20 is increased as a solution to this problem, it will be impossible to satisfy the demand for a low cost and space saving.

However, since the first embodiment begins execution of the catalyst-early-warming control at the start of the engine 11, the upstream-side catalyst 17 can be early activated. Thus, since the upstream-side catalyst 17 can be activated with a high degree of reliability after the engine start before the amount of HC absorbed by the HC absorbent 20 reaches the saturated level, the HC absorbent 20 first absorbs HC generated by the engine 11 and the upstream-side catalyst 17 then removes the HC reliably right after the engine start, thereby allowing the amount of exhausted HC to be considerably reduced in comparison with the conventional exhaust gas purification apparatus. In addition, as the time to activation of the upstream-side catalyst 17 can be made shorter, the amount of HC absorbed by the HC absorbent 20 can be reduced by a quantity in proportion to the decrease in time. As a result, it is possible to satisfy the demand for a low cost and space saving because there is no need to increase the size of the HC absorbent 20.

As described above, in the first embodiment, an intake pressure drives the switching damper 22. Alternatively, the switching damper 22 may also be driven by a means such as a motor or an electromagnetic actuator.

(Second Embodiment)

Figure 3:
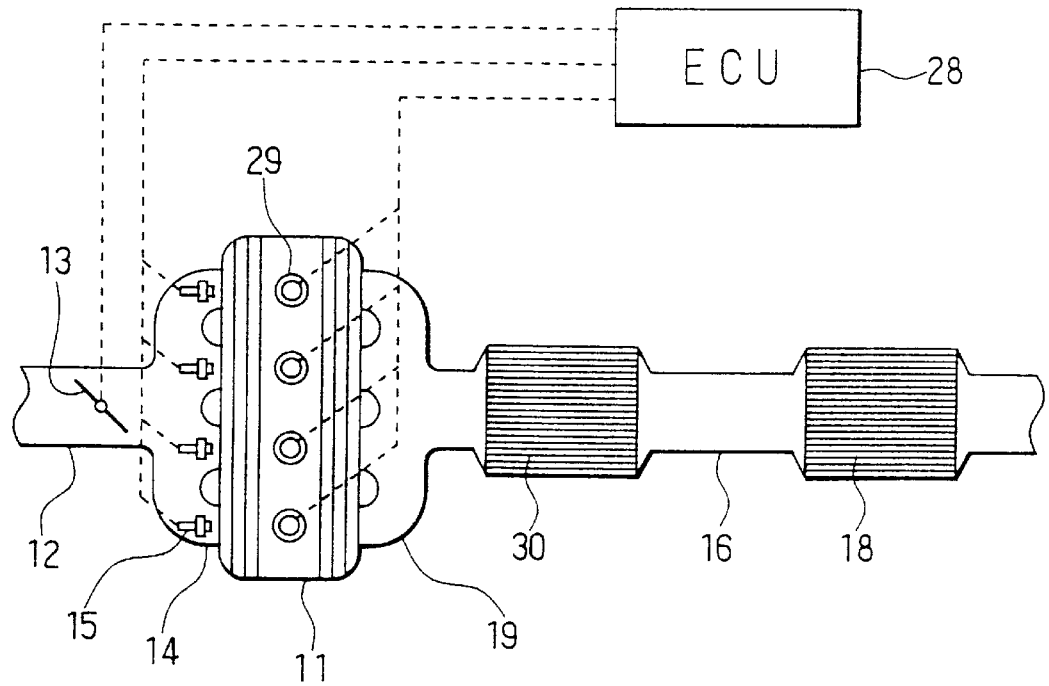
FIG. 3 is a schematic view showing an engine control system (second embodiment)
Figure 4:
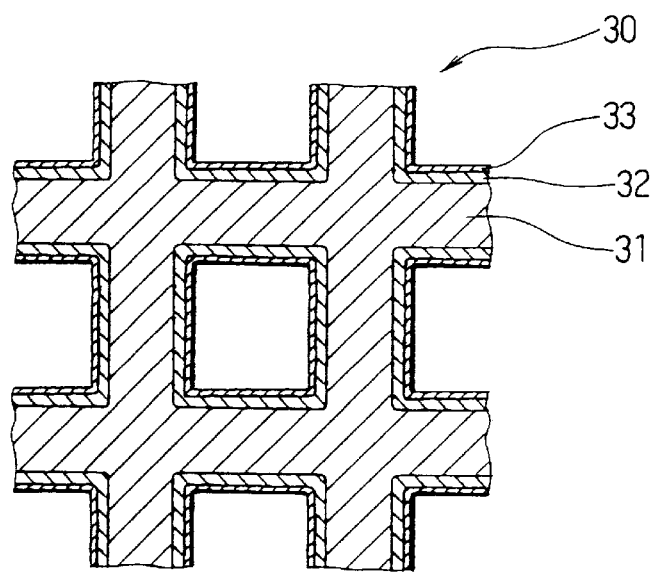
FIG. 4 is an enlarged view showing a two-layer coat catalyst in cross section (second embodiment)

The second embodiment of the present invention is explained with reference to FIGS. 3–7. In the second embodiment, a two-layer coat catalyst 30 is provided at a location close to the exhaust manifold 19 in the exhaust pipe 16 as shown in FIG. 3. A downstream-side catalyst 18 is provided at the downstream side of the two-layer coat catalyst 30 typically on the lower surface of the vehicle body. As shown in FIG. 4, the 2-layer coat catalyst 30 is formed by coating an HC absorbent 32 made of typically zeolite on the inner surface of a catalyst support 31 and coating a catalyst 33 such as a three-way catalyst or an oxide catalyst on the surface of the HC absorbent 32. The catalyst support 31 has a shape resembling a honeycomb made of ceramic such as cordierite. The catalyst 33 is formed into a multi-porous shape having a large number of fine pores. The HC passes through the pores and flows to the HC absorbent 32 absorbing the HC.

Figure 5A:
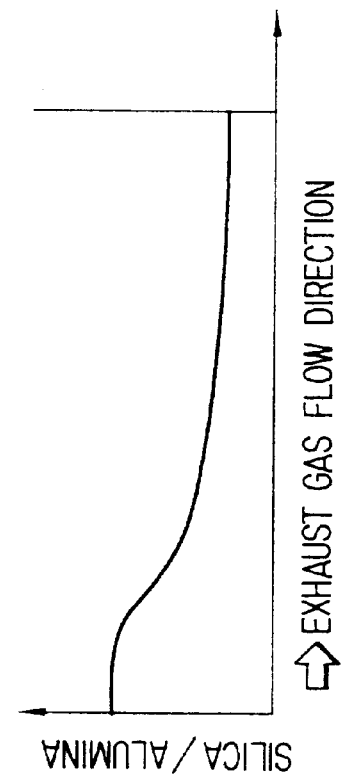
FIG. 5A is a diagram showing a distribution of the catalyst amount in a two-layer coat catalyst in the direction of an exhaust-gas flow (second embodiment)

The catalyst 33 in the two-layer coat catalyst 30 is formed so that a portion on the downstream side of the two-layer coat catalyst 30 holds more HG than a portion on the upstream side thereof as shown in FIG. 5A. Thus, a large amount of HG is removed at the downstream side of the 2-layer coat catalyst 30.

Figure 5B:
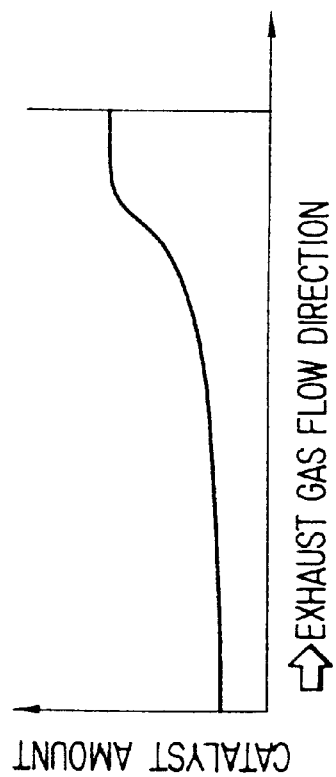
FIG. 5B is a diagram showing a distribution of the ratio of silica to alumina in an HC absorbent of the two-layer coat catalyst in the direction of the exhaust-gas flow.

The zeolite used for the HC absorbent 32 of the two-layer coat catalyst 30 includes silica and alumina materials. As the ratio of the silica to the alumina is higher, the heat resistance of the HC absorbent 32 is better, but the absorption rate thereof is lower. In order to solve this problem, as shown in FIG. 5B, the ratio of the silica to the alumina in the zeolite of the upstream-side portion of the HC absorbent 32 exposed to a high temperature gas is set to high value to perform a good heat resistance and, on the other hand, the ratio of the silica to the alumina in the zeolite of the downstream-side portion of the HC absorbent 32 exposed to lower temperature gas lower is set to low value to perform a good absorption rate.

In addition, as shown in FIGS. 6A and 6B, the two-layer coat catalyst 30 is designed to have a long portion in contact with exhaust gas to improve the purification rate thereof. To be more specific, the length L in the flowing direction of exhaust gas is set greater than an average diameter D of the cross section. That is, the two-layer coat catalyst 30 is formed in a thin long shape in the exhaust gas flowing direction.

According to the second embodiment, the ECU 28 executes a catalyst-early-warming control just after the engine 11 starts, in order to raise the temperature of the catalyst 33 of the two-layer coat catalyst 30 at an early time so as to shorten the time it takes to activate the catalyst 33.

When the catalyst 33 of the two-layer coat catalyst 30 and the downstream-side catalyst 18 are not capable of removing HC right after the engine start, HC in the exhaust gas flowing into the two-layer coat catalyst 30 passes through the fine pores of the catalyst 33 to be absorbed by the HC absorbent 32.

After the catalyst 33, in the of the two-layer coat catalyst 30, directly exposed to the exhaust gas has been heated to an activation temperature and become sufficiently capable of removing HC, the HC absorbent 32 is heated to a release temperature. When the HC absorbent 32 is heated to the release temperature, the catalyst 33 removes HC released from the HC absorbent 32. At that time, the ECU 28 executes a control to shift the air-fuel ratio of the exhaust gas to a lean side at a timing when the HC is released from the HC absorbent 32, so that a rich component attributed to the HC released from the HC absorbent 32 is neutralized by a lean component resulting from the lean control of the exhaust gas and, as a result, the air-fuel ratio in close to the catalyst 33 is maintained in a high purification rate range. This function corresponds to a lean control means recited in an aspect of the present invention.

HC reduction effects of the exhaust gas purification apparatus implemented by the second embodiment described above are explained with reference to FIG. 7. According to the second embodiment, the two-layer coat catalyst 30 is installed at a location in close to the exhaust manifold 19 and execution of the catalyst-early-warming control is begun right after the engine 11 starts. Thus, the catalyst 33 can be activated within about 5 seconds after the engine start to allow the catalyst 33 to well remove HC. Thus, since the catalyst 33 can be activated with certainty after the engine start before the HC absorbent 32 is saturated, HC can be removed reliably so that the amount of exhausted HC at the engine start can be considerably reduced in comparison with the conventional exhaust gas purification apparatus.

In addition, in the second embodiment, the air-fuel ratio of the exhaust gas is shifted to the lean side when the HC absorbed by the HC absorbent 32 is released from the HC absorbent 32 at the engine start, so that the air-fuel ratio in close to the catalyst 33 is maintained in the high purification rate range. Thus, a reaction to remove the released HC can be promoted. As a result, as shown in FIG. 7, the amount of exhausted HC can be further reduced in comparison with a case in which the lean control is not executed. Moreover, the temperature of the exhaust gas is raised due to a combustion delay caused by the lean control, and the amount of reaction heat generated by the purification reaction is increased so that the operation to raise the catalyst temperature can be effectively promoted.

Here, in the present invention, the lean control may not have to be executed. Even in this case, the object of the present invention can be achieved with certainty. It should be noted that the lean control to shift the air-fuel ratio of the exhaust gas to a lean side might be executed in the first embodiment.

The temperature on the downstream side of a catalyst normally increases more gradually than that on the upstream side so that the HC purification rate of the downstream side tends to be lower than the upstream side. With this temperature distribution taken into consideration, the second embodiment is designed into such a configuration that the amount of the catalyst 33 of the two-layer coat catalyst 30 on the downstream side thereof is larger than that on the upstream side thereof. In such a configuration, the HC purification reaction quantity on the downstream side of the two-layer coat catalyst 30 is increased and the temperature on the downstream side is faster raised by the reaction heat. As a result, the purification rate on the downstream side of the two-layer coat catalyst 30 and, hence, the purification rate of the entire two-layer coat catalyst 30 is improved.

In an exhaust gas purification apparatus wherein the two-layer coat catalyst 30 is installed at a location in close to the exhaust manifold 19 as in the second embodiment, the two-layer coat catalyst 30 is exposed to the high temperature exhaust gas.

It is thus necessary to provide the HC absorbent 32 of the two-layer coat catalyst 30 with a heat resistance. As described earlier, however, the zeolite used for the HC absorbent 32 has a character that, as the ratio of the silica to the alumina is higher, the heat resistance of the HC absorbent 32 is better but the HC absorption rate thereof is lower. With this character taken into consideration, in the second embodiment, the ratio of the silica to the alumina in the zeolite of the upstream-side portion of the HC absorbent 32 of the two-layer coat catalyst 30 exposed to the high temperature gas is set to high value to perform a good heat resistance and, on the other hand, the ratio of the silica to the alumina in the zeolite of the downstream-side portion of the HC absorbent 32 exposed to lower temperature gas is set to low value to perform a good HC absorption rate. As a result, it is possible to provide the HC absorbent 32 with both good heat resistance and good HC absorption rate.

It should be noted that the distribution of the amount of the catalyst 33 in the two-layer coat catalyst 30 and the ratio of the silica to the alumina of the HC absorbent 32 in the flow direction of exhaust gas may be changed properly as long as both good heat resistance and good HC purification rate of the two-layer coat catalyst 30 can be attained.

In the exhaust gas purification apparatus disclosed in JP-A-11-82111, a two-layer coat catalyst is provided at the downstream side of a three-way catalyst. Only a three-way catalyst layer of the two-layer coat catalyst is capable of removing HC released from an HC absorbent of the two-layer coat catalyst. Thus, when the three-way catalyst layer cannot remove the released HC completely, some HC not removed is unavoidably exhausted to the atmosphere.

In this respect, in the second embodiment, the downstream-side catalyst 18 is provided at the downstream side of the two-layer coat catalyst 30. Thus, both the layer of the catalyst 33 in the 2-layer coat catalyst 30 and the downstream-side catalyst 18 are capable of removing HC released from the HC absorbent 32 of the two-layer coat catalyst 30. Even if the catalyst 33 in the two-layer coat catalyst 30 is not capable of removing all HC released from the HC absorbent 32, the downstream-side catalyst 18 is capable of removing the remaining so that the HC purification rate can be improved with high certainty.

According to the embodiments explained above, the catalyst-early-warming control, the ignition timing retard control, the air-fuel-ratio lean control, the secondary-air introduction control and the later ignition control are executed to increase the temperatures of exhaust gas and the catalyst. Alternatively, an electrically heated catalyst can be employed to allow direct heating of the catalyst. In the case of an engine wherein fuel is injected directly into cylinders as is the case with a cylinder injection engine, double injection control may be executed in order to inject a little fuel during the later half of an expansion stroke or during an exhaust stroke after a regular injection of fuel so as to implement after-burning.

(Third Embodiment)

Figure 8:
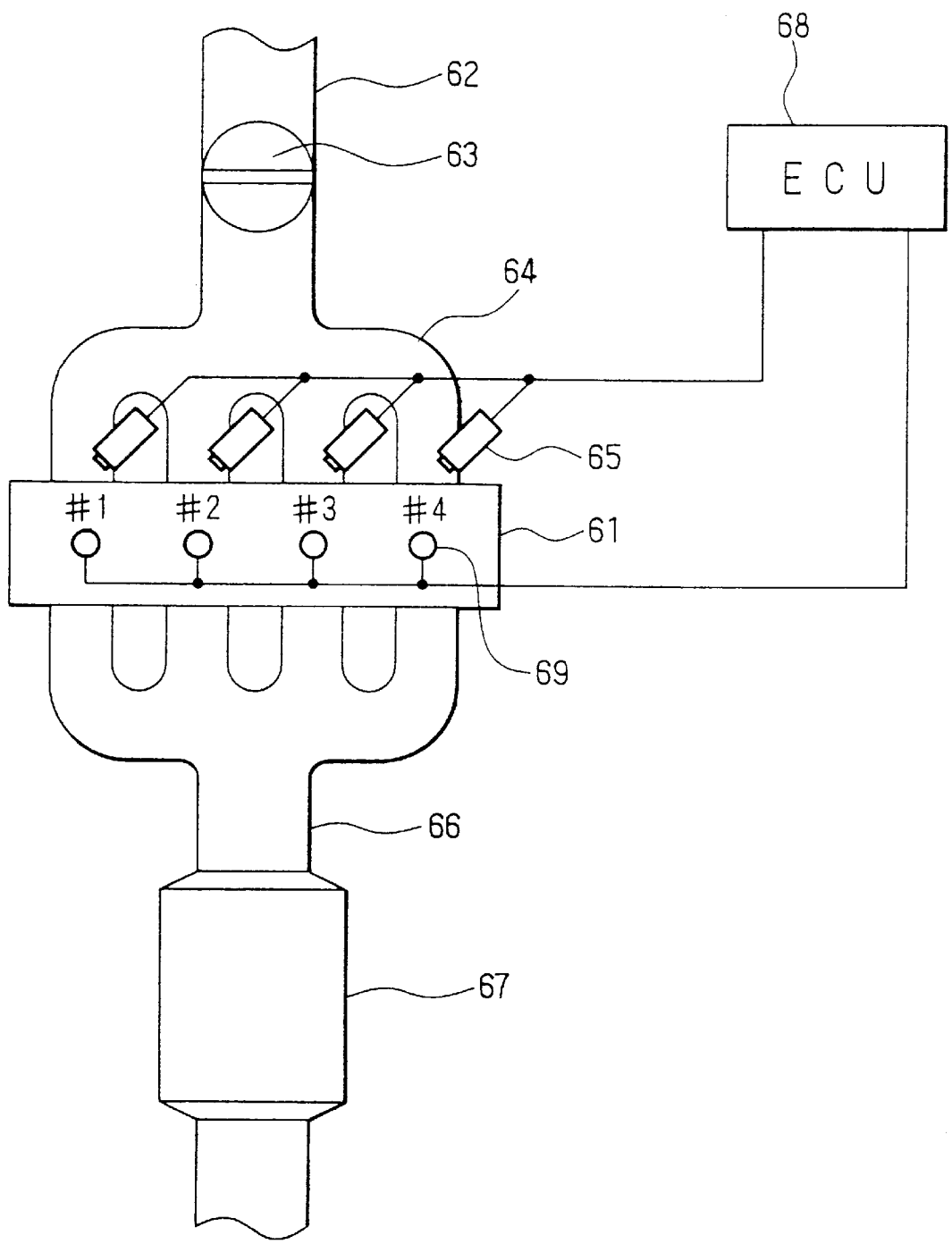
FIG. 8 is a schematic view showing an entire engine control system (third embodiment)

Next, the third embodiment of the present invention will be explained with reference FIGS. 8–12. As shown in FIG. 8, a throttle valve 63 for adjusting throttle opening is provided in an intake pipe 62 of an internal combustion engine 61. A fuel injection valve 65 for injecting fuel into cylinders is installed at a location in close to an intake port of an intake manifold 64 for introducing air to the cylinders. On the other hand, a catalyst 67 such as a three-way catalyst for removing HC, CO and NOx from exhaust gas is provided in an exhaust pipe 66 of the engine 61.

An engine control circuit 68, which is referred to hereafter as an ECU, employs a microcomputer as a main component. By execution of a fuel injection control program stored in an embedded ROM (a storage medium), the ECU 68 controls the quantity of the fuel injection of the fuel injection valve 65. In addition, by execution of an ignition control program stored in the ROM, the ECU 68 controls ignition timings of an ignition plug 69. It should be noted that neither the fuel injection control program nor the ignition control program is illustrated.

In a cold condition at a start of the engine 61, the catalyst 67 is in a non-activated state so that the catalyst 67 is not capable of effectively removing HC, CO and NOx exhausted from the engine 61.

Figure 9:
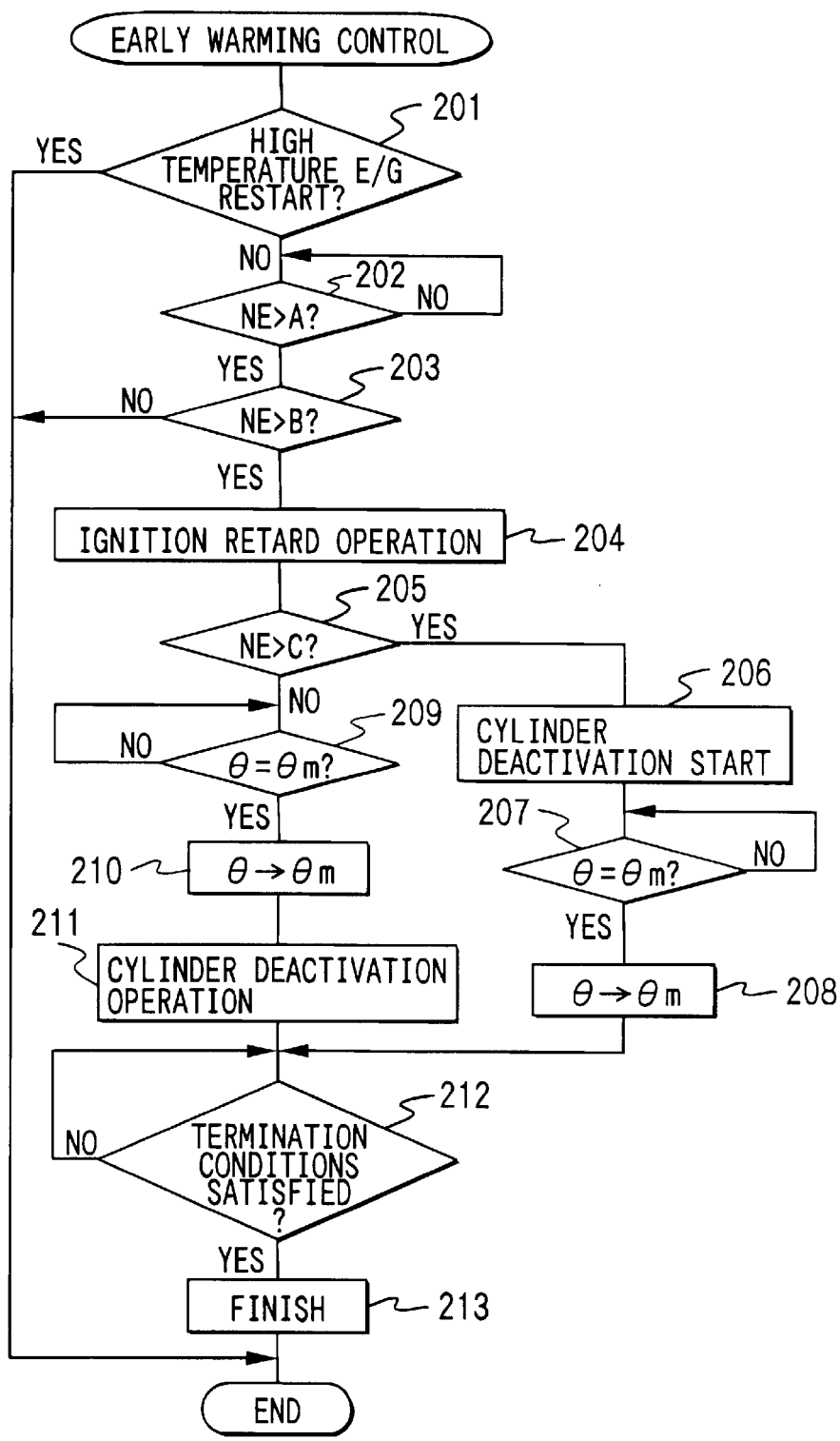
FIG. 9 is a flowchart showing a processing of a catalyst-early-warming program (third embodiment)

In order to solve this problem, the ECU 68 executes a catalyst-early-warming control program shown in FIG. 9 to apply ignition retard control in order to raise the exhaust gas temperature making rich components of the exhaust gas, namely, HC and CO, combustible in the exhaust pipe 66, and in order to halt injection of fuel into some cylinders of the engine 61 such as cylinder #1, operating the engine 61 by the remaining cylinders such as cylinders #2 through #4 by a cylinder deactivation operation as shown in FIG. 10. By implementing the ignition retard control and the cylinder deactivation operation during the catalyst-early-warming control at the same time as described above, the rich components of high-temperature gas exhausted from the working cylinders are mixed with oxygen of unburned air exhausted from the halted-injection cylinder, causing after-burning to naturally occur in the exhaust pipe 66 at the upstreamside of the catalyst 67 so that the temperature of the catalyst 67 is raised by combustion heat generated by the after-burning.

The following description will explain detailed processing of the catalyst-early-warming control implemented by execution of the catalyst-early-warming control program shown in FIG. 9. When an ignition switch (not illustrated) is turned on, this program functions as an exhaust-gas-heating control means and a cylinder deactivation operation control means, which are cited in the aspects of the present invention. When this program is carried out, the temperature of cooling water or the like is examined to determine whether the engine 61 has been restarted at a high temperature (STEP 201). If the engine 61 has been restarted at a high temperature, the catalyst 67 is assumed to be in an activated state. In this case, the catalyst-early-warming control is deemed to be unnecessary so that the execution of the program is ended without carrying out the remaining processing.

If the engine 61 has not been restarted at a high temperature, or the engine 61 is determined to be in a cold-start state, the flow of the processing goes to a step 202 to check whether the engine speed NE has exceeded a start criterion value A of typically 400 rpm to determine whether the starting of the engine 61 or a burning stroke has been completed. When the starting of the engine is determined to have been completed, the flow of the processing goes to a step 203 to determine whether the engine speed NE has exceeded a first combustion criterion value B of typically 1400 rpm within a predetermined period of time beginning from the completion of the engine start. If the engine speed has not exceeded the first combustion criterion value B within the predetermined period of time beginning from the completion of the starting, the state of combustion can be considered to be in an unstable condition. In this case, the catalyst-early-warming control, that is, the ignition retard control and the cylinder deactivation operation, are deemed to be unnecessary so that the execution of the program is ended without carrying out the remaining processing.

If the engine speed NE has exceeded the first combustion criterion value B within the predetermined period of time beginning from the completion of the engine start, the state of combustion can be considered to be in a stable condition. In this case, the flow of the processing goes to a step 204 at which an ignition retard operation is started to delay the ignition timing θ of the ignition plug 69 by an angular rate of typically 0.01 degrees CA/1 ms. Then, the flow of the processing goes to the next step 205 to determine whether the state of combustion is in a sufficiently stable condition based on the increasing engine speed NE right after the start of the ignition retard operation. This stable condition of the state of combustion is determined by determination of whether the engine speed NE has exceeded a second combustion criterion value C of typically 1500 rpm, which is slightly higher than the first combustion criterion value B.

Figure 11:
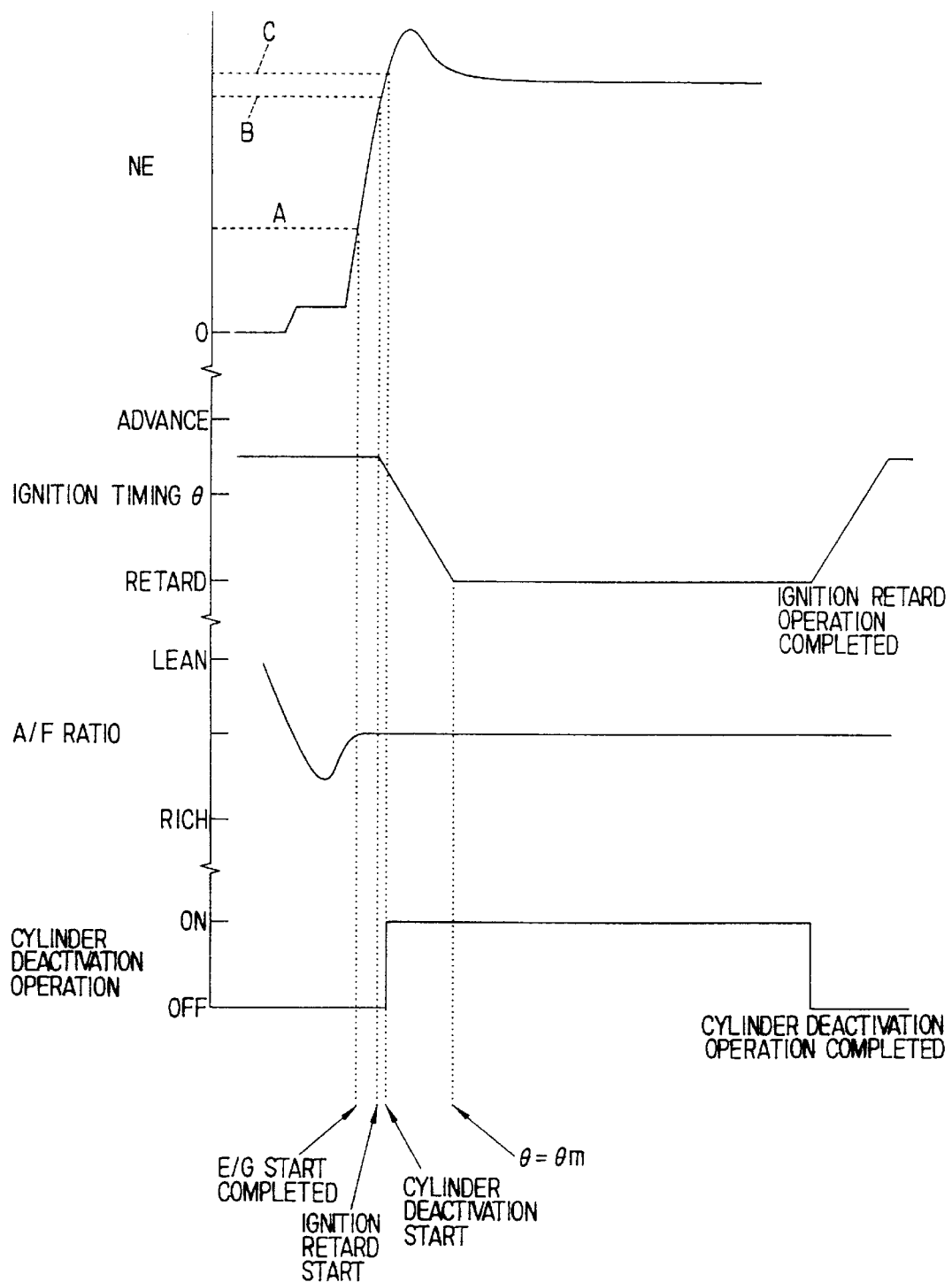
FIG. 11 is a time chart showing a catalyst-early-warming control executed in a state of combustion stabilized right after the start of an ignition retard operation (third embodiment)

When the engine speed NE has exceeded the second combustion criterion value C right after the start of the ignition retard operation as shown in FIG. 11, the state of combustion is considered to be in a sufficiently stable condition. In this case, it is determined to be safe even if a cylinder deactivation operation is carried out right after the start of the ignition retard operation. Thus, the flow of the processing goes to a step 206 at which a cylinder deactivation operation is started immediately and injection of fuel to the halted-injection cylinder is stopped. During the cylinder deactivation operation, an air-fuel ratio of mixed air supplied to each of the operating cylinders is controlled to remain at a value close to theoretical air-fuel ratio or a value slightly shifted to lean side so that the amount of HC included in gas exhausted from the working cylinders does not increase excessively in comparison with the amount of oxygen included in unburned air exhausted from the halted-injection cylinder. In addition, the combustion state of the working cylinders is stabilized by carrying out a multiple-ignitions operation for each of the working cylinders. In the multiple-ignitions operation, ignition is carried out a plurality of times during one combustion cycle.

After the cylinder deactivation operation is started, the flow of the processing goes to a step 207 to determine whether the ignition timing θ has been delayed to a target ignition timing θm. The target ignition timing θm is set to an ignition timing (for example, ATDC10° CA) that allows exhaust gas temperature to be raised at which rich components in the exhaust gas can be burned in the exhaust pipe 66. If the ignition timing θ has not been delayed to the target ignition timing θm, the ignition retard operation is continued to delay the ignition timing θ of the ignition plug 69 by the angular rate of 0.01 degrees CA/1 ms. After that, when the ignition timing θ is delayed to the target ignition timing θm, the flow of the processing goes to a step 208 at which the ignition timing θ is fixed at the target ignition timing θm. Then, the flow of the processing goes to a step 212. By execution of the ignition retard control, gas temperature exhausted by the working cylinders is highly raised, thereby introducing the after-burning in the exhaust pipe 66 at the upstream side of the catalyst 67 so that the temperature of the catalyst 67 is raised by combustion heat generated by the after-burning.

When the stability of the combustion deteriorates right after the start of the ignition retard operation, the rotation speed NE of the engine 61 will not increase well. Thus, the engine speed NE is determined less than the second combustion criterion value C at the step 205. In this case, since the state of combustion right after the start of the ignition retard operation is determined to be not sufficiently stable, the flow of the processing goes to a step 209 at which the ignition retard operation is continued to delay the ignition timing θ to the target ignition timing θm instead of carrying out the cylinder deactivation operation immediately. When the ignition timing θm is delayed to the target ignition timing θm, the flow of the processing goes to a step 210 at which the ignition timing θ is fixed at the target ignition timing θm. Subsequently, the flow of the processing goes to a step 211 at which a cylinder deactivation operation is started. Thus, high-temperature exhaust gas exhausted from the working cylinders is mixed with unburned air exhausted from the halted-injection cylinder, thereby introducing the after-burning in the exhaust pipe 66 at the upstream side of the catalyst 67 so that the temperature of the catalyst 67 is raised by combustion heat generated by the after-burning.

The flow of the processing then goes to a step 212 to determine whether termination conditions that the catalyst-early-warming control (ignition retard control and the cylinder deactivation operation) are completed are satisfied or not. Examples of the conditions indicating the termination of the catalyst-early-warming control are listed as follows:

1: A predetermined period T has passed since the completion of starting of the engine 61.

2: The automatic transmission is shifted from N range to D range.

3: The vehicle is racing (that is, the acceleration pedal is being operated).

Here, the predetermined period T specified in the first condition defines a time duration long enough for warming the catalyst 67 to an activation temperature. Thus, if the first condition is satisfied, the operation to heat the catalyst 67 is determined to have been completed. In the case of the second and third conditions, since the engine load increases, it is necessary to increase the stability of the combustion and an engine torque. Therefore, it is desirable to end the catalyst-early-warming control.

When none of the first through third conditions is satisfied, the catalyst-early-warming control is continued. After that, when any one of the first through third conditions are satisfied, it is taken as a timing to end the catalyst-earlywarming control. In this case, the flow of the processing goes to a step 213 at which the catalyst-early-warming control is finished and the program is ended.

According to the third embodiment described above, during execution of the catalyst-early-warming control, the ignition timing θ is delayed to the target ignition timing θm and the exhaust gas temperature to be raised at which the rich components of the exhaust gas can be burned in the exhaust pipe 66. Simultaneously, the cylinder deactivation operation is carried out to mix the rich components of high-temperature gas exhausted from the working cylinders with oxygen contained in unburned air exhausted by the halted-injection cylinder, thereby introducing after-burning so that the temperature of the catalyst 67 is raised by combustion heat generated by the after-burning. Thus, the temperature of the catalyst 67 can be raised at an early time by combustion heat generated by the after-burning without an ignition device for igniting the exhaust gas. As a result, it is possible to achieve both an improved catalyst-warming performance and a low cost due to a simplified configuration reducing the number of components.

Here, right after the start of engine 61 in which the catalyst-early-warming control is executed, the engine 61 is still cold. Thus, the amount of HG contained in exhaust gas tends to increase. When air-fuel ratio of supplied mixed gas into the working cylinders is shifted to a rich side during execution of the catalyst-early-warming control, the amount of HG exhausted from the working cylinders will become excessively large in comparison with the amount of oxygen contained in unburned air exhausted from the halted-injection cylinder so that it is feared that the amount of HG exhausted to the atmosphere will unavoidably increase.

In this respect, in the third embodiment, during the cylinder deactivation operation, the air-fuel ratio of mixed gas supplied into each of the working cylinders is controlled to remain at a value close to the theoretical air-fuel ratio or a value slightly shifted to the lean side, so that the amount of HC included in the gas exhausted from the working cylinders can be reduced to the minimum amount of HC required for after-burning. Thus, HC included in the exhaust gas can be sufficiently burned by oxygen contained in unburned air exhausted from the halted-injection cylinders. As a result, the amount of HC exhausted to the atmosphere during the catalyst-early-warming control can be reduced.

In addition, in the third embodiment, a multiple-ignitions operation is carried out for each working cylinder during the cylinder deactivation operation. Thus, while ignition retard control is being executed, the combustion state in each working cylinder can be stabilized by the multiple-ignitions operation. As a result, the third embodiment offers an advantage of an ability to suppress torque variations and engine vibration during the cylinder deactivation operation. Note, however, that it is not absolutely necessary to implement the multiple-ignitions operation during the cylinder deactivation operation in the present invention. Even without carrying out a multiple-ignitions operation, the object of the present invention can be fully achieved.

Here, viewing from the catalyst-early-warming aspect, it is desirable to start the ignition retard control and the cylinder deactivation operation as early as possible. However, when the cylinder deactivation operation is started before the state of combustion is sufficiently stabilized, torque variations and engine vibration may increase.

With this problem taken into consideration, in the present embodiment, the state of combustion right after the start of ignition retard operation is evaluated by examining how the engine speed NE increases right after the start of ignition retard operation. When the engine speed NE has exceeded the second combustion criterion value C right after the start of ignition retard operation as shown in FIG. 11, the state of combustion is considered to be in a sufficiently stable condition. In this case, a cylinder deactivation operation is started right after the start of the ignition retard operation. Thus, while variations in torque are being suppressed by the cylinder deactivation operation, the cylinder deactivation operation (catalyst-warming operation by after-burning) can be started at an early time.

Figure 12:
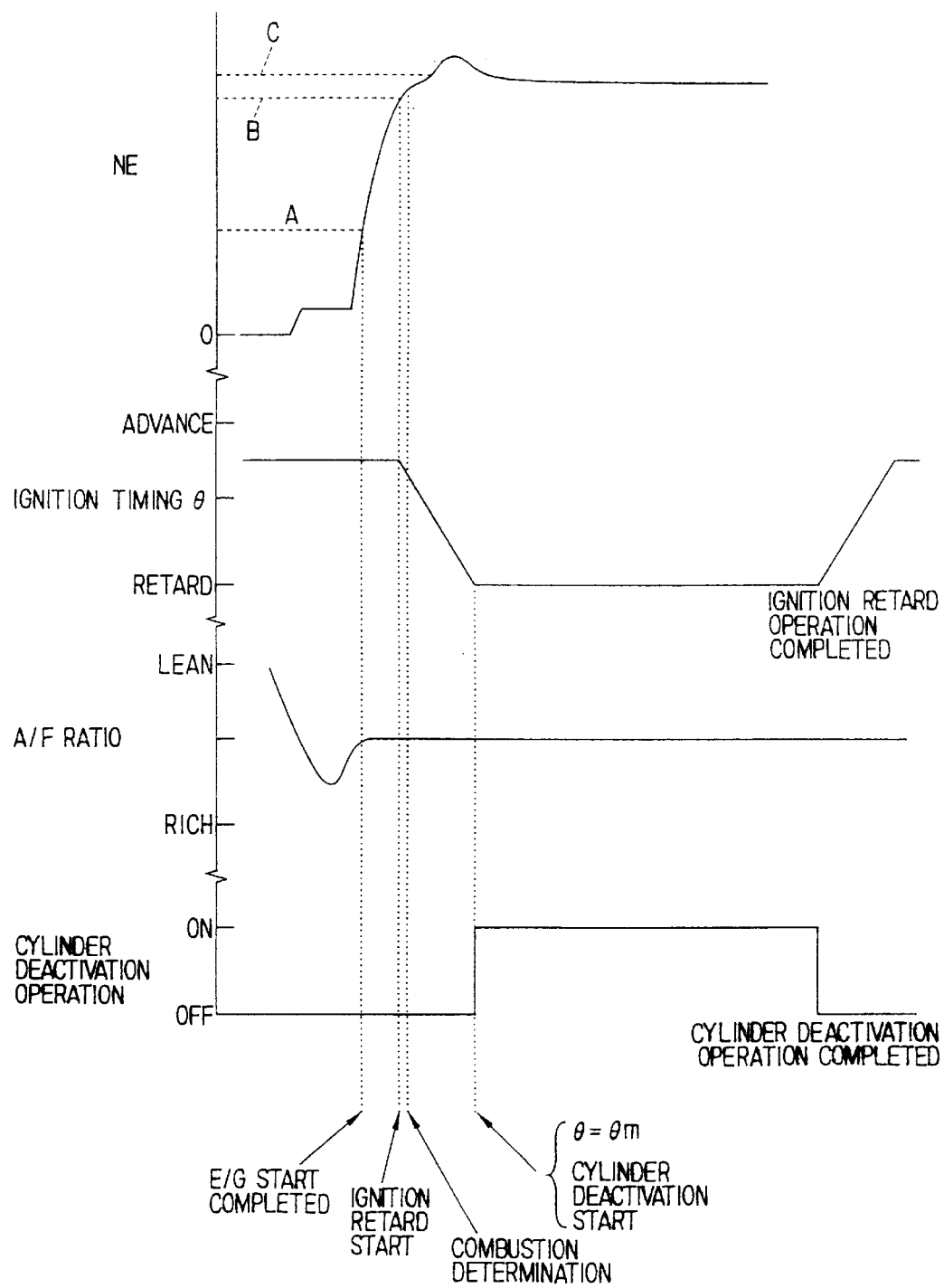
FIG. 12 is a time chart showing a catalyst-early-warming control executed in an unstable state of combustion right after the start of the ignition retard operation (third embodiment)

When the engine speed NE has not exceeded the second combustion criterion value C right after the start of ignition retard operation as shown in FIG. 12, the state of combustion is considered to be not in a sufficiently stable condition. In this case, a cylinder deactivation operation is started only after the ignition retard operation is completed. That is, a cylinder deactivation operation is started after the state of combustion gets stabilized. As a result, torque variations and engine vibration can be reduced during the cylinder deactivation operation.

According to the present embodiment, it is not always necessary to change the start timing of the cylinder deactivation operation in accordance with the operating state (or the combustion state). That is, the start timing of the cylinder deactivation operation may be fixed. In this case, the ignition retard control can be started after the start of the cylinder deactivation operation, at the same time as the cylinder deactivation operation or after the cylinder deactivation operation. When the cylinder deactivation operation is started before the ignition retard control as is the case with the former control, catalyst-early-warming control can be executed while the amount of HC included in the exhaust gas is being reduced by the cylinder deactivation operation and, hence, the amount of HC exhausted to the atmosphere can be decreased during the execution of the catalyst-early-warming control. When the ignition retard control is started at the same time as the cylinder deactivation operation or after the cylinder deactivation operation as is the case with the latter control, the start timing of the cylinder deactivation operation can be delayed in comparison with the former control. Thus, the cylinder deactivation operation can be started under a state of combustion more stable than the former control. As a result, torque variations and engine vibration can be reduced during the cylinder deactivation operation.

Moreover, in the third embodiment, the halted-injection cylinder is fixed during the cylinder deactivation operation. For example, cylinder #1 is used as a fixed halted-injection cylinder. It should be noted, however, that the designation of halted-injection cylinder may be changed sequentially from one cylinder to another. For example, the designation of the halted-injection cylinder is sequentially changed from one cylinder to another for each cycle among a plurality of predetermined cylinders. Accordingly, torque fluctuation caused by the halted-injection cylinder is distributed among the predetermined cylinder, thereby improving feeling of the driver. As a result, the cylinder deactivation operation can be carried out without causing the driver to feel discomfort.

It should be noted that injections of fuel into a plurality of cylinders may of course be halted at the same time during the cylinder deactivation operation.

(Fourth Embodiment)

Figure 13:
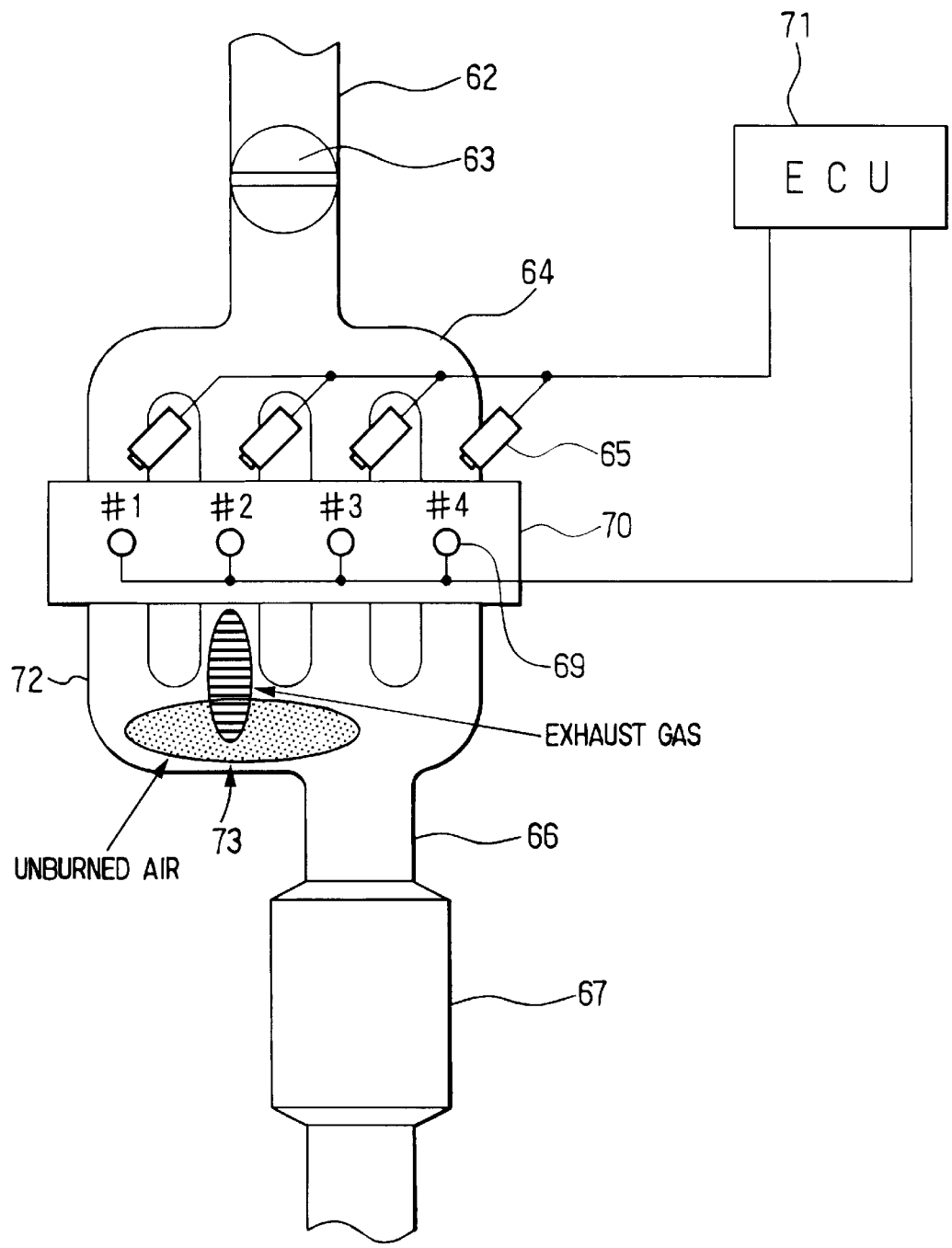
FIG. 13 is a schematic view showing an entire engine control system (fourth embodiment)

In the fourth embodiment shown in FIG. 13, an electromagnetic exhaust valve (not illustrated) serving as a variable valve timing means is provided for each cylinder of an engine 70. The electromagnetic exhaust valve is operated by an electromagnetic driving device (not illustrated). An ECU 71 controls the electromagnetic driving device in order to change the valve timing of the exhaust valve freely. The ECU 21 also adjusts the valve timing of the exhaust valve provided for a halted-injection cylinder such as cylinder #1 so that unburned air exhausted from the halted-injection cylinder is merged with high-temperature gas exhausted from at least one of the working cylinders at a merge portion 73 in an exhaust manifold 72. Here, the exhaust valve provided for the halted-injection cylinder is opened and closed by a plurality of times per cycle, so that unburned air exhausted from the halted-injection cylinder is merged with high-temperature gas exhausted from each of the working cylinders at the merge portion. When the exhaust valve provided for the halted-injection cylinder is opened and closed by a plurality of times per cycle, an intake valve may be opened during an intake stroke and a combustion (expansion) stroke of the halted-injection cylinder to absorb the intake air two times during one cycle. The remaining configuration and the remaining control are the same as in the third embodiment.

According to the fourth embodiment having the configuration described above, unburned air exhausted from the halted-injection cylinder is merged and well mixed with high-temperature gas exhausted from the working cylinders at the merge portion in the exhaust manifold 72 with certainty, so that the after-burning can be promoted effectively.

As described above, the forth embodiment employs an electromagnetic exhaust valve. Alternatively, in an engine having a cam driving type exhaust valve, it is possible to employ an oil-pressure driving type variable valve timing mechanism wherein the phase of a cam shaft with respect to a crank shaft is changed by using an oil pressure to change the valve timing of the exhaust valve.

(Fifth Embodiment)

Figure 14:
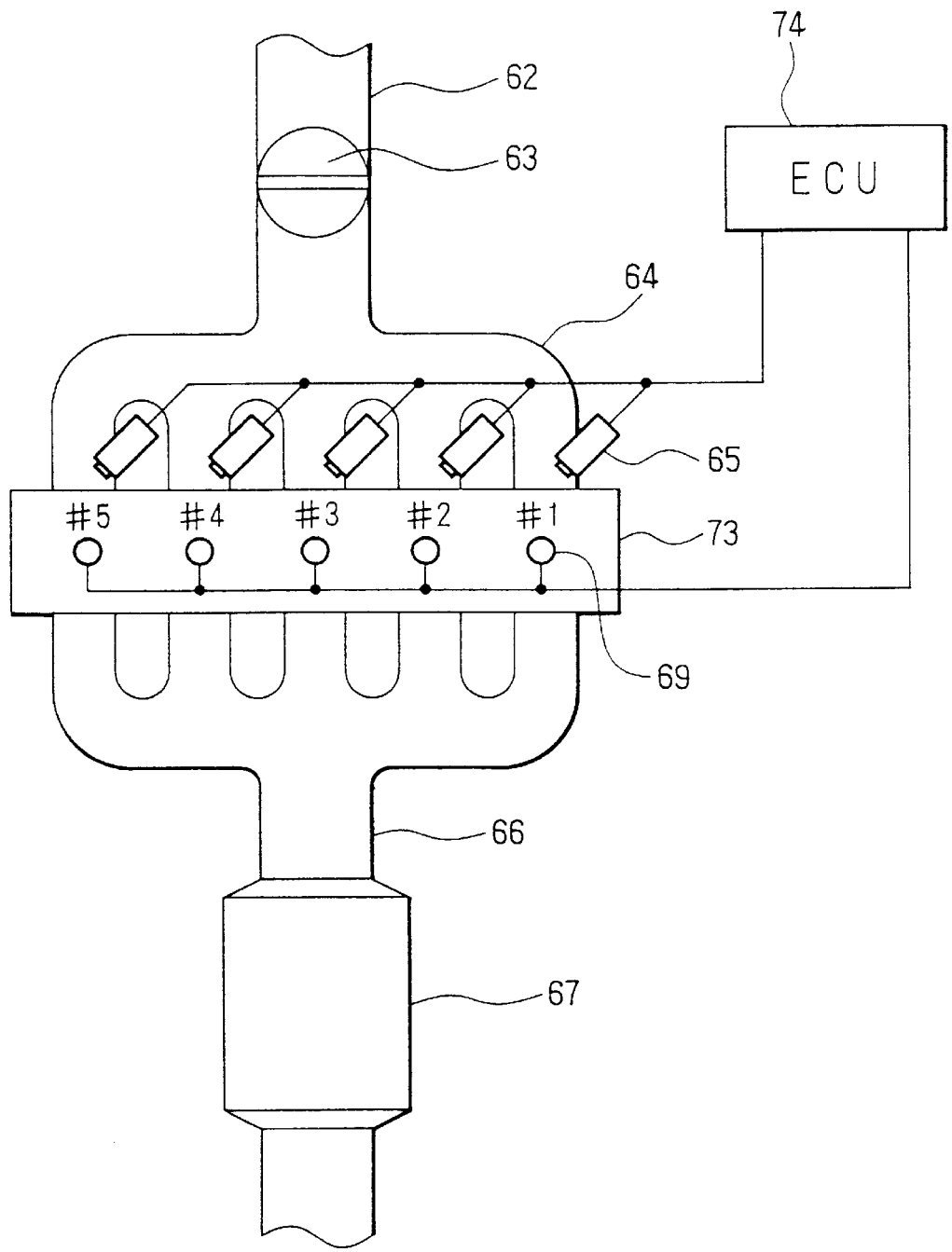
FIG. 14 is a schematic view showing an entire engine control system (fifth embodiment).

Next, the fifth embodiment of the present invention will be explained with reference to FIG. 14. In the fifth embodiment, an electromagnetic intake valve and an electromagnetic exhaust valve are provided for each cylinder of an engine 73 having typically five cylinders. It should be noted that neither the intake valve nor the exhaust valve is shown in FIG. 14. An ECU 74 controls each electromagnetic driving device controlling the intake and exhaust valves to adjust the valve timings of the intake and exhaust valves.

The ECU 24 halts injection of fuel to a halted-injection cylinder, cylinder #5 for example. At the same time, the ECU 24 controls the valve timings of the intake valves and the exhaust valves provided for the working cylinders, which are implemented by cylinders #1 through #4 in this case, and fuel injection timing and ignition timing at predetermined crank-angular intervals (for example, 180° CA). The crank-angular interval of 180° CA is found by dividing 720° CA by the number of working cylinders, which is four in this case. The remaining configuration and the remaining control are the same as in the first embodiment.

According to the fifth embodiment having the configuration described above, a combustion can be generated at fixed crank-angular intervals, which are obtained as a result of dividing 720° CA by the number of working cylinders. Thus, the engine 73 can be operated at the same combustion cycles as in an engine having as many cylinders as the working cylinders of the engine 73. As a result, torque fluctuation and engine vibration can be reduced during the cylinder deactivation operation.

In the third through fifth embodiments described above, the present invention is applied to four or five cylinders engine. It should be noted, however, the present invention can also be applied to engines having a different number of cylinders.

What is claimed is:

1. An early-warming control apparatus for warming a catalyst for purifying exhaust gas of an internal combustion engine at an early time, said early-warming control apparatus comprising:

an exhaust-gas-heating control means for executing ignition retard control to raise the exhaust gas temperature making a rich component of the exhaust gas burnable inside a path on an upstream side of the catalyst through which the exhaust gas flows during execution of control to heat the catalyst at an early time;

a cylinder deactivation operation control means for halting injection of fuel into at least one cylinder of said internal combustion engine and operating the internal combustion engine by using remaining cylinders during execution of the control to heat the catalyst at an early time; and a variable valve timing means for changing a valve timing of each exhaust valve provided in the internal combustion engine, wherein said cylinder deactivation operation control means changes the valve timing of the exhaust valve provided for each of the halted-injection cylinders during a cylinder deactivation operation in accordance with the valve timing of the exhaust valve provided for each of working cylinders so that high-temperature gas exhausted from said remaining cylinders is merged and mixed with unburned air exhausted from said at least one, halted-injection cylinder at a merge portion in an exhaust manifold of the cylinders to enable afterburning of a burnable component of the exhaust gas in the path upstream of said catalyst.

2. An exhaust gas purification apparatus for an internal combustion engine comprising:

an HC absorbent for absorbing HC from exhaust gas generated by said internal combustion engine;

a catalyst for removing HG released from said HG absorbent; and a catalyst-early-warming means for increasing the temperature of the catalyst early, right after a start of said internal combustion engine in order to activate the catalyst at an early time;

said catalyst-early-warming means including:

an exhaust-gas-heating control means for executing ignition retard control to raise the exhaust gas temperature making a rich component of the exhaust gas burnable inside a path on an upstream side of the catalyst through which the exhaust gas flows during execution of control to heat the catalyst at an early time; and a cylinder deactivation operation control means for halting injection of fuel into at least one cylinder of said internal combustion engine and operating the internal combustion engine by using remaining cylinders during execution of the control to heat the catalyst at an early time; and further comprising a variable valve timing means for changing a valve timing of each exhaust valve provided in the internal combustion engine, wherein said cylinder deactivation operation control means changes the valve) timing of the exhaust valve provided for each of the halted-injection cylinders during a cylinder deactivation operation in accordance with the valve timing of the exhaust valve provided for each of the remaining, working cylinders being used so that high-temperature gas exhausted from said remaining cylinders is merged and mixed with unburned air exhausted from said at least one, halted-injection cylinder at a merge portion in an exhaust manifold of the cylinders to enable after-burning of a burnable component of the exhaust gas in the path upstream of said catalyst.

3. An exhaust gas purification apparatus for an internal combustion engine comprising:

an HG absorbent for absorbing HG from exhaust gas generated by said internal combustion engine;

a catalyst for removing HC released from said HG absorbent; and a catalyst-early-warming means for increasing the temperature of the catalyst early, right after a start of said internal combustion engine in order to activate the catalyst at an early time;

said catalyst-early-warming means including:

an exhaust-gas-heating control means for executing ignition retard control to raise the exhaust gas temperature making a rich component of the exhaust gas burnable inside a path on an upstream side of the catalyst through which the exhaust gas flows during execution of control to heat the catalyst at an early time; and a cylinder deactivation operation control means for halting injection of fuel into at least one cylinder of said internal combustion engine and operating the internal combustion engine by using remaining cylinders during execution of the control to heat the catalyst at an early time, whereby high-temperature gas exhausted from said remaining cylinders is mixed with oxygen of unburned air exhausted from said at least one, halted-injection cylinder to enable after-burning of a burnable component of the exhaust gas in the path, wherein the cylinder deactivation operation control means controls an air-fuel ratio of air-fuel mixture supplied to the remaining cylinders to a value close to a theoretical air-fuel ratio or a value slightly shifted to a lean side.

4. An exhaust gas purification apparatus for an internal combustion engine according to claim 3, wherein the cylinder deactivation operation control means carries out ignition a plurality of times in one combustion cycle of each of the remaining cylinders during a cylinder deactivation operation.

5. An exhaust gas purification apparatus for an internal combustion engine according to claim 3, wherein said exhaust-gas-heating control means commences ignition retard control after said cylinder deactivation operation control means has started a cylinder deactivation operation.

6. An exhaust gas purification apparatus for an internal combustion engine according to claim 3, wherein a cylinder deactivation operation is started at the same time or after said exhaust-gas-heating control means commences ignition retard control.

7. An exhaust gas purification apparatus for an internal combustion engine according to claim 3, wherein said cylinder deactivation operation control means changes a timing to start a cylinder deactivation operation in accordance with a driving state after a start of said internal combustion engine.

8. An exhaust gas purification apparatus for an internal combustion engine according to claim 3, wherein said cylinder deactivation operation control means sequentially changes one of the cylinders to serve as one of the halted-injection cylinders during a cylinder deactivation operation.

9. An exhaust gas purification apparatus as in claim 3, wherein an exhaust valve is provided for the halted-injection cylinder and a valve timing adjusting means adjusts the valve timing of the exhaust valve so that unburned air exhausted from the halted-injection cylinder is merged with high-temperature gas exhausted from at least one of the working cylinders at a merge portion upstream of the catalyst.

\* \* \* \* \*